(No Model.)
L. COYNE.
CLOTHES LINE HOOK.
No. 363,601. Patented May 24, 1887.
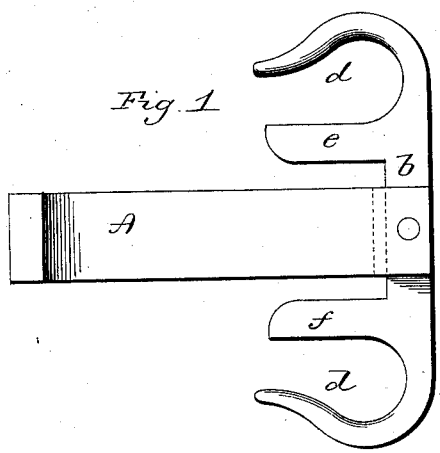
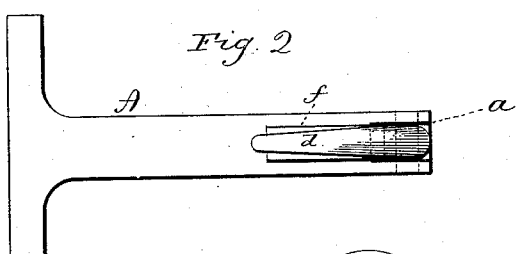
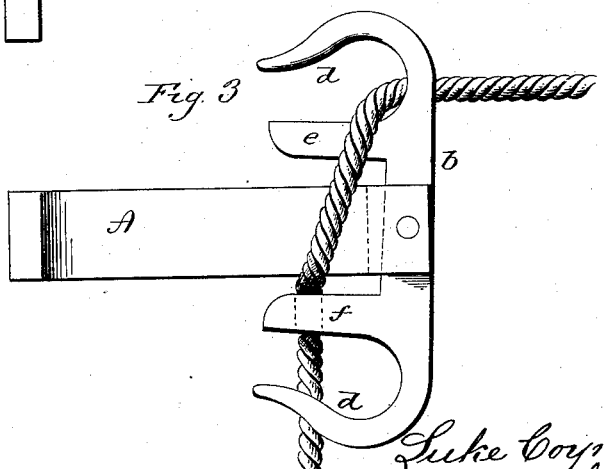
Witnesses.
Luke Coyne, Inventor
By Atty.

UNITED STATES PATENT OFFICE.

LUKE COYNE, OF NEW HAVEN, CONNECTICUT.

CLOTHES-LINE HOOK.

SPECIFICATION forming part of Letters Patent No. 363,601, dated May 24, 1887.

Application filed December 20, 1886. Serial No. 222,075. (No model.)

*To all whom it may concern:*

Be it known that I, LUKE COYNE, of New Haven, in the county of New Haven and State of Connecticut, have invented a new Improvement in Clothes-Line Hooks; and I do hereby declare the following, when taken in connection with the accompanying drawings and the letters of reference marked thereon, to be a full, clear, and exact description of the same, and which said drawings constitute part of this specification, and represent, in—

Figure 1, a top view of the hook complete; Fig. 2, a side view of the same; Fig. 3, a top view showing the application of the line.

This invention relates to an improvement in clothes-line hooks, and particularly to that class in which the line is secured without tying. In many of the devices known for this purpose the construction requires two hands to secure, loosen, or release the line, and are more or less complicated and expensive.

The object of this invention is to produce a hook cheap to manufacture and one on which the line may be easily secured or released.

A represents the frame or post, which is constructed with straight sides and adapted to be secured to a wall, post, or other convenient place. In the outer end of the frame is a transverse slot, $a$. In the slot $a$ a bar, $b$, is pivoted, and on each end of said bar a hook, $d$, is formed, said hooks opening inward. The bar extends inward at each end substantially parallel with the sides of the frame, to form a jaw, $ef$, respectively, each side of the frame, and which with the said respective sides of the frame form pairs of clamping-jaws. The line is secured by passing it into one of the hooks $d$, under or over the frame A, and between the jaw and frame on the opposite side, as seen in Fig. 3; and as the strain is brought to bear upon the hook through which the line passes it draws that hook forward, thereby forcing the jaw on the other side toward the frame, and so as to firmly clamp the line. The greater the strain upon the line the tighter will it be clamped.

The ends of the jaws are preferably rounded outward, so as to more readily permit the line to be forced in between the jaws and the frame. The bar, with the jaws and their hooks, may be cast complete in one piece, and the frame cast to receive the bar, so that the cost of manufacture is very light.

I am aware that a clothes-line holder has been constructed consisting of a lever, one arm of which upon one side of the fulcrum forms a clamp for the line, the other arm constructed with a loop upon the opposite side of the fulcrum, so that the strain of the line on one arm brings the other arm to a clamping position, and therefore do not claim, broadly, such a holder.

I claim—

In a clothes-line holder, the post A, having a transverse slot in its outer end, combined with a bar, $b$, hung upon a pivot in said slot, the said bar constructed with a hook, $d$, at each end, and also with jaws $ef$, the said jaws projecting from the inside of the bar along the respective sides of the post, and so as to form clamps against the said respective sides of the post, substantially as described.

LUKE COYNE.

Witnesses:
FRED C. EARLE,
J. H. SHUMWAY.